Nov. 14, 1950 J. M. KRAFFT 2,529,615
APPARATUS FOR CONTINUOUSLY AND
INSTANTLY MEASURING EFFICIENCY
Filed June 5, 1947 2 Sheets—Sheet 1
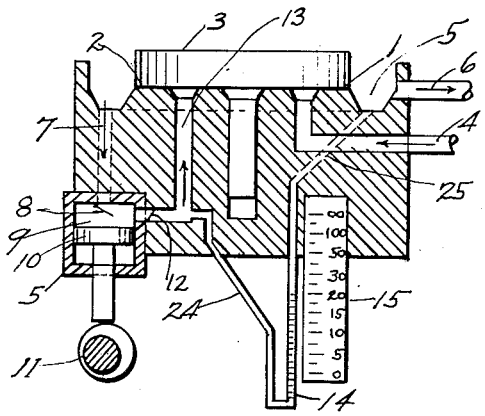
Fig.1
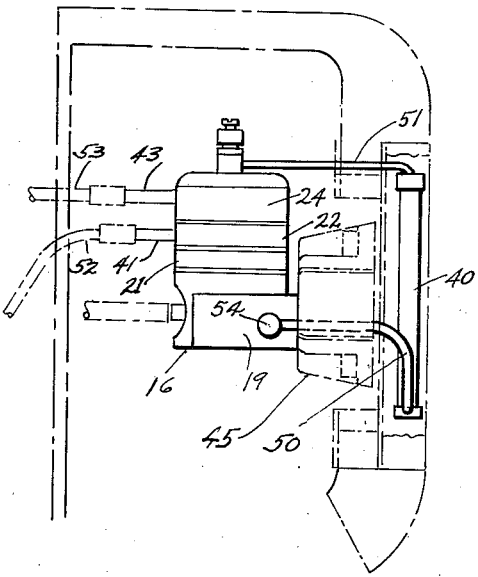
Fig.2
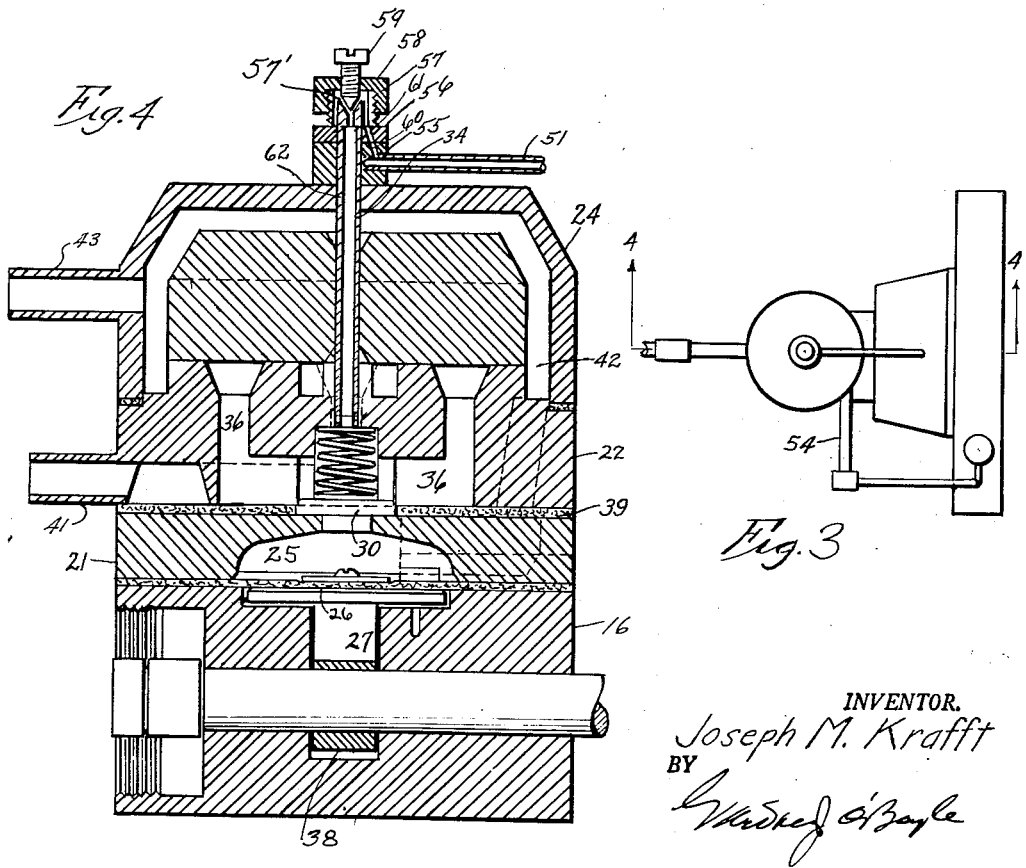
Fig.4
Fig.3
INVENTOR.
Joseph M. Krafft
BY
[signature]

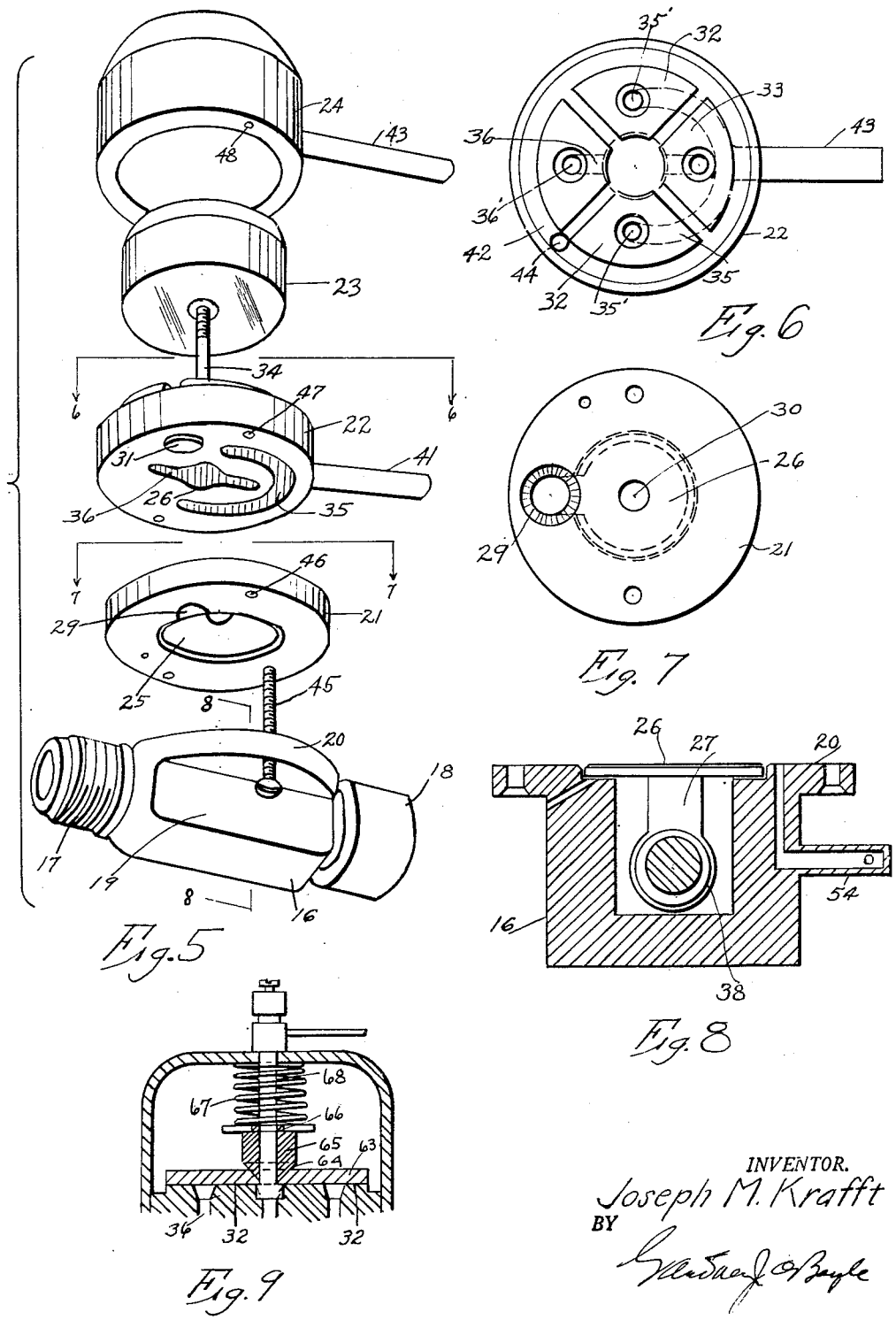

Patented Nov. 14, 1950

2,529,615

UNITED STATES PATENT OFFICE 2,529,615

APPARATUS FOR CONTINUOUSLY AND INSTANTLY MEASURING EFFICIENCY

Joseph M. Krafft, Alexandria, Va.

Application June 5, 1947, Serial No. 752,855

6 Claims. (Cl. 73—114)

My invention relates to a ratio indicating device, and more particularly to a meter for continuously and instantaneously indicating efficiency as the ratio between the rate of liquid fuel consumption and the work rate as proportional to rotative or linear speed.

A practical application of the device of the present invention will be described in connection with the measurement of automobile efficiency in terms of miles per gallon, however, it will be understood that the basic concept of the invention is not limited to such use, since in its broadest aspect the invention comprehends means for obtaining and using a pressure differential as a function of the ratio of the rates of flow of two similar fluids irregardless of the quantities represented by the flows.

It has heretofore been suggested to provide devices to measure relative efficiency by means of a continuously reading meter. In a conventional type of meter, a centrifugal force device is employed to obtain a displacement or force as a function of the rotative or linear speed of the vehicle, and a flow sensitive element is used to obtain pressure as a function of the rate of flow. By various methods, which are of questionable practicability and of doubtful theoretical correctness, the displacements and forces are divided to give the desired quotient in miles per gallon.

The most common errors result from ignoring the effects of wide changes in fuel viscosity encountered in practice. The mechanisms intended to divide are often not dividing mechanisms at all, and they simply substract the two forces, which are not usually logarithmic. Dividing devices which theoretically could work are usually complicated and are accurate only within a very limited range of speed and consumption. Usually at low speeds and consumption, these devices are inherently insensitive or if not they are likely to induce too high a pressure drop in the fuel line at high rates of consumption.

Devices heretofore proposed for indicating relative duration of the intake stroke of the ordinary automobile diaphragm fuel pump fail to indicate correctly except when the machine is in high gear with a solid clutch. Devices for measuring and dividing temperature rise induced by electrical heaters in two fluid paths are difficult to set up and install, and they are also slow to respond to changes.

An object of my invention is to provide an improved method for continuously and instantaneously measuring efficiency.

Another object of my invention is to provide an improved meter for continuously and instantaneously indicating efficiency as the ratio between the rate of liquid fuel consumption and the work rate as proportional to rotative or linear speed.

Yet a further object of my invention is to provide an improved meter for continuously and instantaneously indicating the efficiency of an automobile in terms of miles per gallon.

Still another object of my invention is to provide an improved efficiency meter for automobiles, characterized by accurate and sensitive measurement over the complete range of speeds and fuel flow for a given vehicle.

A further object of my invention is to provide an improved efficiency meter which is gravity independent, and also completely independent of fuel viscosity.

Yet a further object of my invention is to provide an improved efficiency meter wherein the range of efficiencies indicated covers the actual range, zero to infinity, on a hyperbolic scale.

A still further object of my invention is to provide an improved efficiency meter for automobiles which is strong and rugged in construction, easy to install, and consisting of but few parts, which are not liable to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

In the drawings:

Figure 1 is a schematic diagram illustrative of the principles of operation of the meter.

Fig. 2 is a side elevational view of a meter mounted in operative position on the instrument panel of an automobile.

Fig. 3 is a plan view along line 3—3 of Fig. 2.

Fig. 4 is a sectional view along line 4—4 of Fig. 3.

Fig. 5 is an expanded view of the meter elements, showing the relative position of the parts prior to their assembly.

Fig. 6 is a plan view along line 6—6 of Fig. 5.
Fig. 7 is a plan view along line 7—7 of Fig. 5.
Fig. 8 is a sectional view along line 8—8 of Fig. 5; and,
Fig. 9 is a detailed view of an optional arrangement for a non-gravity dependent differential gauge.

Before proceeding with the detailed description of my improved ratio indicating device, it is to be noted that in the adaptation of the meter to measurement of the efficiency of an automobile, I utilize a small diaphragm pump driven by the speedometer cable, the pump being designed to pump fuel through an auxiliary circuit at a rate directly proportional to the speed of the vehicle, thus making available two flows of the same kind of fluid; one equal to the rate of consumption and the other one proportional to the speed.

Division is accomplished by use of Poiseuille's theorem applied to the separation of two flat circular concentric plates by viscous liquid flow from a circular hole in the center of one of the plates through parallel separation spaces to the outer periphery of the plates. With this arrangement, the pressure difference between the fluid source at the central hole and the outer periphery is directly proportional to the total load pressing the plates together and is independent of viscosity and rate of flow within the viscous flow range. If two sets of identical plates are constrained to maintain equal clearance and support a constant load pressing both plates together, the load is supported by either plates or divided in any proportion between the two. Accordingly, for any given ratio of flows through the two identical plates the sum of the pressure drops between the two sets of plates will be a constant sufficient to support the total constant load, however, the ratio of the pressure drops will be equal to the ratio of the rates of flow since the fluid resistance, which is only a function of the geometrical configuration of the viscous flow passage from the center to outside of the plates, is identical for each of the equally spaced identical plates.

It will thus be seen that the pressure drop measured across any one of the plates will be a hyperbolic function of the ratio of the two flows, and in the case where one flow is proportional to speed and the other equal to the rate of consumption, this pressure is proportional to the ratio of miles per gallon. Measurement of the pressure can be accomplished with a simple mercury filled U tube or with other differential type pressure gauges, calibrated in suitable units.

With the foregoing simple case described by way of explanation, an examination of the general theory underlying this type of division is useful in demonstrating the necessary and sufficient conditions for a pressure differential to occur as a function of a ratio of flow rates. In general, if viscous flow is maintained between two parallel surfaces pressed together by a load R, the pressure differential P incurred in the flow may be expressed:

$$P = kR = l\frac{u}{h^3}G \quad (1)$$

where $k$ and $l$ are constants of proportionality and also functions of the dimensions of the restriction, $G$ is the flow rate, $u$ is the viscosity, and $h$ is the clearance between the parallel surfaces. Since two sets of restrictions are provided, the parameters relating to each are designated by subscripts 1 and 2. Thus for two sets of parallel plate restrictions not necessarily the same, coupled to support a common load R, maintains equal clearance and restrict fluids of the same viscosity.

$$R = \frac{P_1}{K_1} + \frac{P_2}{K_2} \quad (2)$$

$$\frac{P_1}{P_2} = \frac{l_1}{l_2}\frac{G_1}{G_2} \quad (3)$$

If we call $$\frac{l}{K} = A$$

the effective area of the valve, and let $$\frac{l_1}{l_2} = L$$

and $$\frac{G_1}{G_2} = r$$

then (2) and (3) may be re-written:

$$R = P_1 A_1 + P_2 A_2 \quad (4)$$

$$\frac{P_1}{P_2} = Lr \quad (5)$$

From the condition imposed, we have two equations (4) and (5) with three unknowns $P_1$, $P_2$, and $r$. Thus, it is possible to solve these for $P_1$ and $P_2$ in terms of $r$. From (5)

$$P_1 = LrP_2 \quad (6)$$

and $$P_2 = \frac{P_1}{Lr} \quad (7)$$

Substituting (7) in (4) we have:

$$R = P_1 A_1 + \frac{P_1}{Lr} A_2 \quad (8)$$

$$P_1 = \frac{R}{A_1 + \frac{A_2}{Lr}} = \frac{RLr}{A_1 Lr + A_2} \quad (9)$$

And substituting (6) in (4) we have:

$$LrP_2 A_1 + P_2 A_2 = R \quad (10)$$

$$P_2 = \frac{R}{A_1 Lr + A_2} \quad (11)$$

Equations (9) and (11) show that the pressure developed across either restriction is a hyperbolic function of $r$ the ratio of the flow rates. Also the difference in the pressures $$P_1 - P_2 = \frac{R(l - Lr)}{A_1 Lr + A_2} \quad (12)$$

is also a hyperbolic function of $r$.
If $A_1 \neq A_2$ then the sum of the pressures $$P_1 + P_2 = \frac{R(l + Lr)}{A_2 + A_1 Lr} \quad (13)$$

is likewise a function of $r$.

The inverse relationships expressing $r$ in terms of $P_1$, $P_2$, $P_1 - P_2$, and $P_1 + P_2$ may be obtained directly from equations (9), (11), (12) and (13).

From (9) solving for $r$ in terms of $P_1$ and the parameters.

$$r = \frac{A_1 P_1}{L(R - A_1 P_1)} \quad (14)$$

From (11) solving for $r$ in terms of $P_2$ and the parameters.

$$r = \frac{R - P_2 A_2}{L A_1 P_2} \quad (15)$$

From (12) solving for $r$ in terms of $(P_1-P_2)$ and the parameters.

$$r = \frac{R - A_2(P_1-P_2)}{L[R + A_1(P_1-P_2)]} \quad (16)$$

And finally from (13) solving for $r$ in terms of $(P_1 P_2)$ and the parameters.

$$r = \frac{A_2(P_1+P_2) - R}{L[R - A_1(P_1+P_2)]} \quad (17)$$

From the foregoing it is apparent that the necessary and sufficient conditions for obtaining a pressure differential as a function of the ratio of the flow rates are that the viscosities of the fluids in both restrictions be the same, the clearance of both restrictions be the same, the load be carried by both valves, and that viscous flow conditions exist between the restrictions.

In the preferred embodiment of the apparatus, the specifications show $A_1=A_2$ and $L=1$. However the scope of the claims is meant to include possible configurations including those in which $A_1 \neq A_2$ and/or $L \neq 1$.

In accordance with the present invention, two sets of plates, as above described, are provided. Reference being had to Fig. 1, it will be noted that the clearance between two sets of plates 1 and 2 is at all times identical although the clearance of both may vary together from zero to any necessary maximum. The dead weight load 3, simultaneously loading the two sets of plates, is constant and the load may be supported separately by either of the plates or jointly by both of them in any proportion. Both plates pass the same kind of fluid at any given time, and, accordingly, at any given instant the ratio of the pressures developed between the two identical sets of plates 1 and 2 is equal to the ratio of the flow rates. In accordance with the theory outlined herein before, the sum of these pressure drops is a constant and hence the pressure across either of the sets of plates is a direct measure of the ratio of the two rates of flow existing at the time. The pressure is in this way a hyperbolic function of the ratio of the two pressures or flows.

In the application of the meter to an automobile, where one flow is equal to the fuel consumption rate and the second flow is made proportional to the speed by means of a direct action pump, the pressure across the plates 2 is a hyperbolic function of the ratio of the speed to rate of consumption or miles per gallon in the usual units. Fuel for the primary fuel consumption circuit enters tube 4, is channeled to the plate 1 and passes between the parallel surfaces of weight 3 and the flat surfaces of the plate. From the plate 1 the fuel flows into a reservoir 5 and eventually out to the engine via tube 6.

For the secondary or speed proportional circuit the fuel is drawn from reservoir 5 through passage 7 and intake valve 8 into pump chamber 9 by piston 10. The piston 10 is driven by an eccentric 11 rotated by an ordinary speedometer cable at a rotative speed proportional to the speed of a vehicle. Thus the discharge of the pump through valve 12 is directly proportional to the speed of the vehicle. This discharge flows through a channel 13 to plates 2 and again out through the parallel clearance between plates 2 and weight 3 to the mixing reservoir 5. The pressure is measured between channel 13 and reservoir 5 by means of a differential pressure gauge 14 having a suitable hyperbolic scale 15, associated therewith.

The limiting conditions are of interest in connection with the operation of the device. First, in the case of motor propelled vehicle, if the vehicle is not in motion but the engine is consuming fuel, the pressure difference between the non-operating pump outlet valve 12 and reservoir 5 will be zero with all the load of weight 3 supported by the flow through plate 1. If, on the other hand, the engine is not running while the vehicle coasts, the total pressure drop occurs across plate 2, supplied by pump piston 10. The pressure between channel 13 and reservoir 5 is then the maximum fixed by the load of weight 3, and the pressure gauge 14 reads infinite miles per gallon.

Referring to Fig. 5, I have shown an expanded view of a practical device for measuring the efficiency of an automobile in terms of miles per gallon, utilizing the means described in connection with the schematic diagram of Fig. 1. The instrument comprises a hollow base or housing designated generally by numeral 16, having a pump, not shown, mounted therein. One end of the housing is formed with a fitting 17 adapted to thread into the back of a conventional automobile speedometer and the opposite end is provided with a female fitting 18 designed to receive the speedometer cable. In other words, the housing is constructed and arranged whereby it may be quickly and easily interposed between the conventional automobile speedometer and the speedometer drive cable. The body portion of the housing is formed with substantially flat side faces 19, having extensions 20, providing a support for discs 21 and 22, weight member 23, and cover member 24, when the parts are assembled, as shown in Fig. 2. The disc 21 is machined as at 25 (Fig. 5), to accommodate the head 26 of piston 27 (Fig. 8), on the upward stroke thereof. The disc is also machined as at 28 and 29 to receive spring-loaded valves 30 and 31, not shown, mounted in discs 21 and 22, respectively.

Referring to Figs. 5 and 6, it will be observed that the shape of the pressure plates 1 and 2 of Fig. 1, have been changed from concentric circles to quarter sectors 32 and 33 of a concentric ring. These quarter sector plates 32 and 33 are shown as integral parts of disk 22 in which they are machined. This change may be shown, by reference to the basic concepts of viscous flow, to effect only the constants in the first and second principles of the theory explained hereinbefore, and thus do not effect the results as combinations of the variables. Due to the mechanical difficulties involved in maintaining identical frictionless clearances between the two sets of plates 1 and 2, generally eccentrically supporting the weight 3 (Fig. 1), a balanced support of four plates comprising quarter sectors 32 and 33, as shown, is incorporated in the practical embodiment of the invention. This system renders the support of weight 23 by any combination of flows across the sectors 32 and 33 inherently stable. Thus the weight 23 maintains constant clearance with only lateral constraint provided by a post 34. To prevent unequal loads on the four plates or sectors, when the meter is not level, the lateral constraint of post 34 on the weight 23 is made to act through the center of gravity of the weight. The passages 35 and 36 are now to two plates, that is to say, to sectors 32 and 33 (Fig. 6) instead of to one plate, as shown in Fig. 1, and are designed to be symmetrical so that the length of the fluid passages to each plate or sectors of the same set are equal. This refinement was found desirable in order to assure equal dynamic pressures be supplied to each sector of one set. It is to be noted that the effect of change of viscosity due to heat generated as the fluid passes between the plates is negligible.

By means of this arrangement of varying the plate clearances, the possibility of clogging the restriction between the plates by foreign material is very remote, and could not be caused by any material which would pass the fuel pump strainer. In any event, if clogging did occur, it would only put the meter out of operation by preventing the plates 32 and 33 from closing, and would not impede the fuel flow to the engine.

The meter of the present invention is designed to operate in series with an ordinary automobile speedometer driven by a flexible shaft, and, accordingly, the torque required to drive the pump, plus the speedometer load, must not be in excess of that available through an ordinary flexible shaft. To accomplish this, the pump is driven by a rocker piston 27, (Fig. 8), with a sleeve bearing contact on the eccentric shaft 38, to avoid the necessity for spring loading the piston for a restoring force and increasing the bearing area.

Since the pressure in the meter between the fuel pump and the carburetor is always higher than atmospheric pressure, the diaphragm type of pump has been found to pump a constant quantity of fuel per stroke irrespective of its speed within the required limits, for example, from 5 to 100 miles per hour. Since the pump stroke required for a sufficient pump capacity per revolution is rather small, the rocking motion of piston 27 is easily absorbed by means of a flexible rubber diaphragm 39, (Fig. 4). In the present arrangement, for a central scale indication of 25 miles per gallon, a piston diameter of 0.8 inch with a stroke 0.02 inch is used for a speedometer cable speed of 1000 revolutions per mile. Since the pressure inside the pump is always higher than atmospheric, lost motion in the eccentric sleeve bearing introduces no inaccuracy by reason of the fact that the piston always exerts a downward load on the eccentric during each cycle. It is to be particularly noted that the meter of the present invention is operative for either direction of pump rotation, that is, when the vehicle moves backward or forward.

The differential pressure gauge used to indicate the ratio of miles per gallon is shown as a mercury-filled well-type manometer 40 (Fig. 2), for the plate loading with a dead weight 23. The weight is such as to impose a maximum pressure drop of about 0.08 pound per square inch over the 2.5 p. s. i. available at the output of the fuel pump. This gives a height of mercury column of about 1.6 inches for full scale.

The choice of a fluid column 40, in conjunction with a dead weight 23, is taken to effect compensation for angular inclination of the meter. It will be readily seen that the normal load exerted by the weight 23 on plates 32 and 33 is equal to the weight times the cosine of the angle of inclination of the meter, however, the height of the mercury column 40 maintained by a given pressure from the normal component of the weight 23 varies as the secant of the angle of inclination. Thus the pressure decrease due to inclination of the weight is exactly compensated for by the corresponding sensitivity increase in the mercury column. This will allow the meter an angle of inclination as high as 45°.

Referring again to Fig. 5, for the primary fuel consumption circuit, the fuel enters tube 41, into passage 35, and then through ports 35' between the parallel surfaces of the weight 23 and the flat surfaces of sectors 32. From sectors 32, the fuel flows into a peripheral groove 42, comprising a reservoir formed between disc 22 and cover 24, and eventually out to the engine through tube 43. For the secondary or speed proportional circuit, the fuel is drawn from reservoir 42, through passage 44 and intake valve 31 into the pump chamber 25, by means of pump mounted in the housing 16, the piston 27 of which, (Fig. 8) is driven by eccentric 38, rotated by the speedometer cable at a speed proportional to the speed of the vehicle. The discharge from the pump, through valve 30, in the center of disc 21, flows through ports 36' to passage 36, sectors 33, and out through the parallel clearance between sectors 33 and weight 23, to the reservoir 42. Pressure is measured between the passage 36 and the reservoir 42 by means of the differential pressure gauge 40, (Fig. 2). The parts or elements of the meter are maintained in assembled position by means of screws or other suitable fastening devices 45, insertable through extensions 20, openings 46 and 47 formed in discs 21 and 22 respectively, and into the cover member 24, which is tapped as at 48, to receive the end of the screw.

Referring to Fig. 2, the meter is shown in its assembled operative position. The indicator 40 is preferably mounted so that it is visible on the face of the dial of the speedometer 49. This can be accomplished by cutting a slot in the dial face to receive a portion of the surface of the indicator tube, and applying a suitable scale to the face, adjacent the slot. The indicator is connected to the meter by means of tubes 50 and 51; connections 52 and 53 are provided between tube 41 and a source of supply of fuel, and between tube 43 and the automobile engine, respectively. One end of tube 50 is connected to the bottom of the indicator, and the other end thereof is connected to an extension 54 formed on the base 16 of the meter (Fig. 8).

Referring to Fig. 4, the tube 51, attached to the top of the indicator, is connected to the meter by means of a fitting 55 adapted to fit over the restraining post 34. The post is threaded at its upper end to receive a fitting 56 having a threaded extension 57 formed thereon, adapted to receive a cap member 58 having an adjustable set screw 59. The fittings 55 and 56 are bored as at 60 and 61 to form a passage between tube 51 and the interior of extension 57, which communicates with a passage 62 formed in the post 34.

It was found desirable to locate the pressure take off points as close as possible to the plate comprising sectors 33, in order to avoid pressure losses in flowing through channel 36 and between the sectors, at high speeds and for high fuel viscosities.

The pulsations of a single cylinder pump of the character used herein, cause pressure fluctuations in the indicator gauge which are a source of oscillations, particularly at low speeds. This is overcome by introducing air capacitance between the exhaust valve 30, sectors 33 and above the reservoir 42, and by damping the gauge by restricting the tubes connecting it with the meter. Damping in this manner inhibits fluctuations due to shock excitations of the erratic motion of a vehicle. Filling the mercury column with a fluid such as fuel tends to act as an inertia filter. By increasing or decreasing the restriction 57' or damping in lines 50 and 51, or by increasing or decreasing the air capacitance in the line between exhaust valve 30 and sectors 33, the gauge may be made to integrate over as long or as short a period of time as desired. Without damping, equilibrium to a given change usually occurs in a matter of a second or two. It will be appreciated that a certain amount of pump pulsation is desirable for the purpose of inhibiting sticking of the weight 23 and gauge 40.

In lieu of using a weight 23, the meter may be equipped with a light weight plate loaded by means of a highly stressed spring, as shown in Fig. 9. In this arrangement a plate 63 is substituted for the weight 23, the plate being formed with a recessed portion 64, adapted to receive a member 65, having a reduced portion 66 upon which a spring 67 seats. The spring is constructed and arranged to surround the post 68 and is compressed between the cover and member 65. By means of a light weight plate, loaded as indicated, slight changes in clearance do not appreciably affect the spring load on the plate, and the indicator gauge is gravity independent and can be operated in any orientation.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. An apparatus for producing a pressure differential as a function of the ratio of the rates of viscous flow of two fluids of the same viscosity comprising a flow restricting valve interposed in each fluid path with relatively movable and fixed parts, linkage connecting corresponding parts of both valves so as to maintain equal clearance between the restricting surfaces of said parts, a constant load tending to simultaneously close both valves, the reaction to said load being the sum of the pressure differentials incurred in the flows through the valves times their respective effective movable surface areas, connections adjacent to said restricting surfaces for measuring the pressure differential across one of said valves.

2. An apparatus for producing a pressure differential as a function of the ratio of the rates of viscous flow of two fluids of the same viscosity comprising a flow restricting valve interposed in each fluid path with relatively movable and fixed parts, linkage connecting corresponding parts of both valves so as to maintain equal clearance between the restricting surfaces of said parts, a constant load tending to simultaneously close both valves, the reaction to said load being the sum of the pressure differentials incurred in the flows through the valves times their respective effective movable surface areas, connections adjacent to said restricting surfaces for measuring the difference of the pressure differentials across both of said valves.

3. An apparatus for producing a pressure differential as a function of the ratio of the rates of viscous flow of two fluids of the same viscosity comprising a flow restricting valve interposed in each fluid path with relatively movable and fixed parts, linkage connecting corresponding parts of both valves so as to maintain equal clearance between the restricting surfaces of said parts, a constant load tending to simultaneously close both valves, the reaction to said load being the sum of the pressure differentials incurred in the flows through the valves times their respective effective movable surface areas, said areas being unequal, connections adjacent to said restricting surfaces for measuring the sum of the pressure differentials across both of said valves.

4. An apparatus for measuring the ratio of the rate of speed of an automotive vehicle to its rate of fuel consumption, comprising a fuel supply conduit, a reservoir junction in said conduit, a secondary closed circuit conduit originating and terminating in said reservoir, a circulating pump interposed in the secondary conduit, means for driving the pump at a speed proportional to the vehicle speed, whereby the rate of fuel circulation in said secondary conduit is proportional to the vehicle speed, means for producing a pressure differential as a function of the ratio of the rates of flow of fuel through the supply conduit and through the secondary conduit comprising a flow restricting valve interposed in each conduit with relatively movable and fixed parts, rigid means connecting corresponding parts of both valves so as to maintain equal clearance between the restricting surfaces of said parts, a constant load tending to simultaneously close both valves, the reaction to said load being the sum of the pressure differentials incurred in the flows through the valves times the respective effective valve area, and a pressure responsive indicator connected adjacent to said restricting surfaces for measuring the pressure differential across one of said valves.

5. An apparatus for measuring the ratio of the rate of speed of an automotive vehicle to its rate of fuel consumption, comprising a fuel supply conduit, a reservoir junction in said conduit, a secondary closed circuit conduit originating and terminating in said reservoir, a circulating pump interposed in the secondary conduit, means for driving the pump at a speed proportional to the vehicle speed, whereby the rate of fuel circulation in said secondary conduit is proportional to the vehicle speed, means for producing a pressure differential as a function of the ratio of the rates of flow of fuel through the supply conduit and through the secondary conduit comprising a flow restricting valve, interposed in each conduit with relatively movable and fixed parts rigid means connecting corresponding parts of both valves so as to maintain equal clearance between the restricting surfaces of said parts, a constant load tending to simultaneously close both valves, the reaction to said load being the sum of the pressure differentials incurred in the flows through the valves times the respective effective valve area, and a pressure responsive indicator connected adjacent to said restricting surfaces for measuring the difference of the pressure differentials across both of said valves.

6. An apparatus for measuring the ratio of the rate of speed of an automotive vehicle to its rate of fuel consumption, comprising a fuel supply conduit, a reservoir junction in said conduit, a secondary closed circuit conduit originating and terminating in said reservoir, a circulating pump interposed in the secondary conduit, means for driving the pump at a speed proportional to the vehicle speed, whereby the rate of fuel circulation in said secondary conduit is proportional to the vehicle speed, means for producing a pressure differential as a function of the ratio of the rates of flow of fuel through the supply conduit and through the secondary conduit comprising a flow restricting valve, interposed in each conduit with relatively movable and fixed parts, rigid means connecting corresponding parts of both valves so as to maintain equal clearance between the restricting surfaces of said parts, a constant load tending to simultaneously close both valves, the reaction to said load being the sum of the pressure differentials incurred in the flows through the valves times the respective effective valve areas, said areas being unequal, and a pressure responsive indicator connected adjacent to said restricting surfaces for measuring the sum of the pressure differentials across both of said valves.

JOSEPH M. KRAFFT.

REFERENCES CITED

The following references are of record in the file of this patent:

UNITED STATES PATENTS

| Number | Name | Date |
|---|---|---|
| 2,352,312 | Donaldson | June 27, 1944 |